Figure 3:
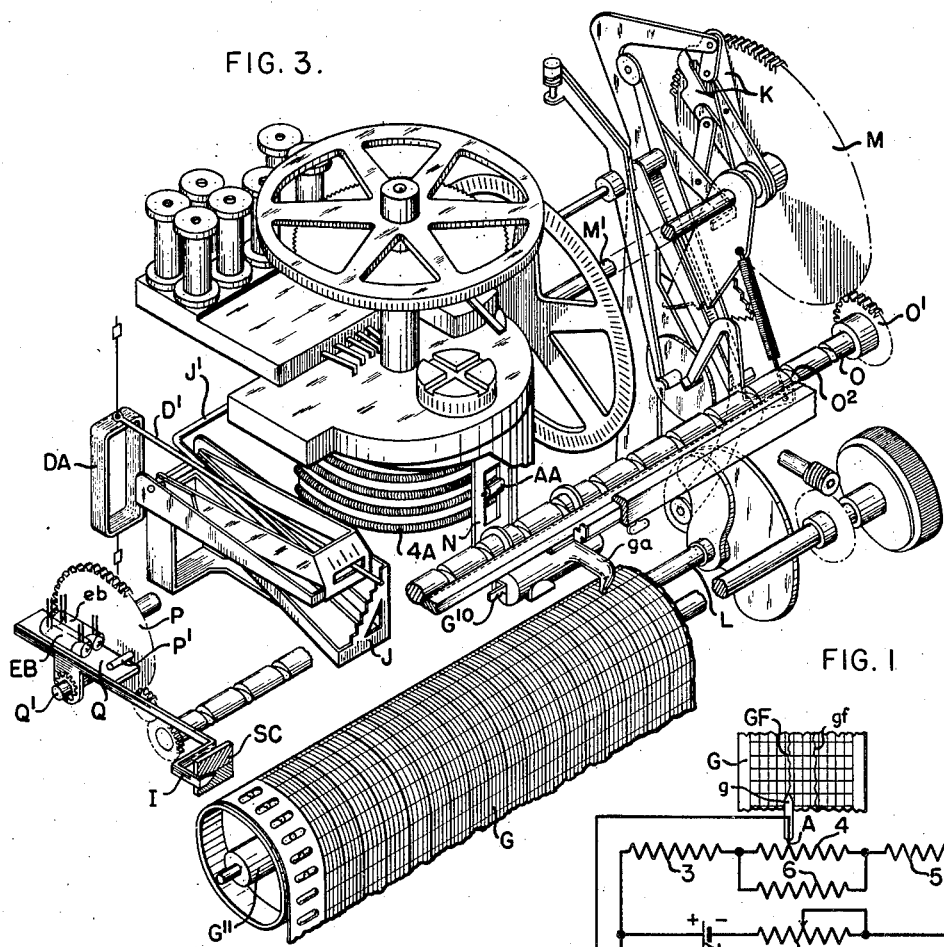

Dec. 12, 1944.  E. M. SMITH  2,364,923

MEASURING APPARATUS

Filed June 12, 1943

*INVENTOR.*
EDGAR M. SMITH

BY *E. B. Spangenberg*

ATTORNEY.

Patented Dec. 12, 1944

2,364,923

UNITED STATES PATENT OFFICE 2,364,923

MEASURING APPARATUS

Edgar M. Smith, Trenton, N. J., assignor to The Brown Instrument Company, Philadelphia, Pa., a corporation of Pennsylvania Application June 12, 1943, Serial No. 490,589

6 Claims. (Cl. 171—95)

The general object of the present invention is to provide potentiometric measuring apparatus with simple and effective means for effecting its adjustment into different operative conditions in which it is adapted to measure voltages of different sources or voltages in respectively different value ranges, in such manner as to effect a suppression scale difference between the measurements of the voltages of the different sources or in the different value ranges.

In practice the present invention will ordinarily be embodied in a self-balancing potentiometric unit which includes a pen carriage or other exhibiting element deflecting in accordance with the values of the quantities measured. Such a unit may not inaptly be termed a multiple range potentiometer, as the relation between the deflective position of the exhibiting element and the value of the quantity measured is different in the different adjustments of the unit. However, the primary purpose of each such adjustment is to produce or to eliminate a scale suppression effect, and not to vary the ratio of the change in the position of the element to the corresponding change in the value of the quantity measured.

The term "scale suppression" is used herein with a meaning well known to the art. For example, if a measuring instrument used in measuring the temperature of a thermocouple has its exhibiting element at the low end of its deflection range for a thermocouple temperatre of 500° in one operative condition, and is then adjusted into a second operative position in which the same position of the element corresponds to a thermocouple temperature of 1000°, the adjustment produces a "scale suppression" effect of 500°.

One specific object of the present invention is to provide a potentiometric measuring network comprising a split potentiometer or bridge, and a measuring branch which may be adjustably connected to said bridge in different ways so as to thereby produce a suppression scale difference between the measurements made in the different adjustments, without changing the resistance or current flow in any portion of said bridge.

Another specific object of the invention is to provide simple and effective means for readily and properly calibrating the network with equally good results in any of the different adjustment conditions of the apparatus.

Another specific object of the invention is to so combine a recording potentiometer instrument with means for successively associating it with each of two or more thermocouples or other sources of E. M. F. which differ little, if at all, in value from one another, in such manner that records of the voltages of the different sources made on a common record sheet will be laterally displaced from one another by a predetermined amount plus or minus the difference, if any, between actual values of the two voltages. By this procedure, I obtain two clearly defined record lines instead of the single blurred record line obtained with an ordinary recording potentiometer when used to alternately measure and record approximately equal voltages of two thermocouples or other sources.

A further specific object of the present invention is to provide a self-balancing potentiometer including a pen carriage or other element deflectable back and forth between low and high scale end positions, with improved means for measuring variations in the value of a quantity through a measurement scale range of greater length than the range of deflection of said deflecting element.

Figure 2:
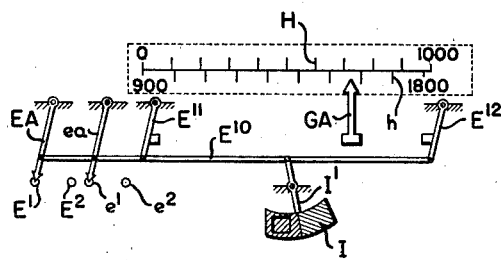
Figure 1:
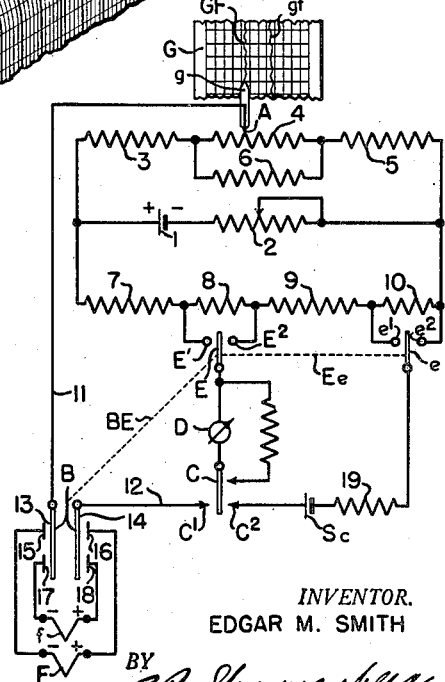

The various features of novelty which characterize my invention are pointed out with particuarity in the claims annexed to and forming a part of this specification. For a better understanding of the invention, however, its advantages and specific objects obtained with its use, reference should be had to the accompanying drawing and descriptive matter in which I have illustrated preferred embodiments of the drawing:

Fig. 1 is a diagram illustrating a potentiometric measuring circuit network and recording means;

Fig. 2 illustrates a switch mechanism which may be used in automatically changing the scale range of measuring means including the circuit shown in Fig. 1 on predetermined changes in the quantity measured; and Fig. 3 is a perspective view diagrammatically illustrating a portion of a potentiometric instrument including means for automatically adjusting switch elements shown diagrammatically in Fig. 2.

The potentiometric measuring circuit network shown diagrammatically in Fig. 1 includes a split potentiometer or bridge, a measuring branch and a calibrating branch. The split potentiometer comprises an energizing branch, a slide wire resistance branch and a second resistance branch, the two resistance branches being connected in parallel with each other and in series with the energizing branch. The energizing branch includes a circuit energizing source of current 1 and an adjustable resistance 2. The slide wire resistance branch, in the form shown, comprises resistors 3, 4 and 5 connected in series with one another, and a resistance 6 connected in parallel with the resistor 4. The latter constitutes the slide wire resistance element of the network and is engaged by a slider or movable contact A adjustable along the length of the resistor 4. The second resistance branch of the split potentiometer includes resistance sections or resistors 7, 8, 9 and 10 connected in series in the order stated between the positive and negative ends of the energizing branch of the circuit.

In its closed or operable condition, the measuring branch of the circuit network shown in Fig. 1 comprises a conductor 11, a commutating or selector switch B, one or the other of the thermocouples F and f, depending upon the adjustment of the switch B, a conductor 12, a standardizing switch C, a galvanometer D, and a range shifting switch E. As diagrammatically shown, the selector switch B comprises contacts or blades 13 and 14 connected to the conductors 11 and 12, respectively, and comprises a pair of cooperating contacts 15 and 16 and a second pair of cooperating contacts 17 and 18. The contacts 15 and 16 are connected to the thermocouple F and are adjustable into and out of a position in which they engage the contacts 13 and 14, respectively. When in engagement with the last mentioned contacts, the thermocouple F is connected between the conductors 11 and 12. The contacts 17 and 18 are connected to the terminals of the thermocouple f and are adjustable into and out of the position in which they engage the contacts 13 and 14, respectively, and then connect the thermocouple f between the conductors 11 and 12 as will be understood. The set of contacts 15 and 16 and the set of contacts 17 and 18 can each engage the contacts 13 and 14 only when the other set is out of engagement therewith.

In the closed condition of the measuring branch of the network, the standardizing switch C is in the position in which it engages a switch contact C' which is connected by the conductor 12 to the switch contact 14. The galvanometer D has one terminal connected to the switch C and normally has its second terminal connected either to one or to the other terminal of the resistor 8, accordingly as the adjustment of the range shifting switch E is such that it engages one or the other of switch contacts E' and E², the contact E' being connected to the positive terminal and the contact E² being connected to the negative terminal of the resistor 8. The latter may be referred to as a scale suppression resistance since when the switch engages the contact E', the measurements which may be effected are higher than those which may be effected when the switch to E engages the contact E².

In the closed condition of the calibration branch of the network shown in Fig. 1, the standardizing switch C is in the position in which it engages the contact C². Said branch comprises the switch E, the galvanometer D, the switch C, the switch contact C², a standard cell Sc, a resistance 19, and a calibration range switch e. The latter is normally in engagement with a contact e' connected to the positive terminal of the resistor 10, or in engagement with a contact e² connected to the negative terminal of the resistor 10 accordingly as the switch E engages the contact E' or contact E², respectively. To this end the switches E and e may be mechanically interconnected as by means of an element Ee. In practice also the switches B and E may be mechanically connected as by means of an element BE so that when one of the thermocouples, for example the thermocouple F, is connected in the measuring branch of the circuit, the switch E will engage the contact E', and so that when the switch E engages the contact E² the thermocouple f will be connected in said measuring branch.

On the assumption that the thermocouples F and f have the polarities indicated in Fig. 1 and are subjected to similar temperatures and generate the same E. M. F. when similarly heated, the position of the contact A along the slide wire resistance 4 at which the potentiometer will be balanced when the switches B and E are adjusted to connect the thermocouple F and the switch contact E' into the measuring circuit, will be to the left of the position at which the potentiometer balance is established when the thermocouple f replaces the thermocouple F in the measuring circuit and the switch E engages the contact E². This results from the fact that the potential of the switch contact E' is higher than that of the contact E². In consequence under conditions in which the same E. M. F. is developed by each thermocouple, the potential of each terminal of the thermocouple F when connected in the measuring circuit is higher than the potential of the corresponding terminal of the thermocouple f when the latter is connected in the measuring circuit.

In Fig. 1 record lines are made on a traveling record chart strip G by a pen print wheel or other marking element g adjusted in proportion to the adjustment of the contact A along the slide wire resistance 4. As diagrammatically shown in Fig. 1, the recording element g and the contact A are mechanically connected so that they have similar movements longitudinally of the resistance 4. However, the marking element g and slide wire contact A may be relatively movable and be given proportional movements as are the slide wire contact AA and pen ga of the well known commercial type of instrument shown in Fig. 3, and more fully disclosed in various prior patents including Patent 2,150,502 of March 14, 1939, and Patent 2,252,301 of August 12, 1941.

On the chart G shown in Fig. 1, the line GF is a record of the voltage of the thermocouple F, and the line gf is a record of the voltage of the thermocouple f. As shown, the said lines are consistent with the assumptions that the voltages of the thermocouples F and f vary similarly and are equal at all times, and that the lateral displacement of the two record lines on the chart G is wholly due to the suppression scale difference between the measurements of the two thermocouple voltages. Stated differently, the lateral displacement of the two record lines GF and gf is due to the fact that when the voltage of the thermocouple F is being measured, the scale suppression resistor 8 produces a measuring scale suppression action which it does not produce in the measurement of the voltage of the thermocouple f. While it is obviously possible to manually adjust the switches B and E to alternately measure and record the temperatures of the thermocouples F and f as just described, in practice mechanism may well be provided for automatically adjusting the commutating switch B, and thereby the mechanically connected switch E, so as to successively measure the temperatures of the thermocouples F and f at regular intervals. Such mechanism is shown in a "Brown potentiometer" for measuring a plurality of thermocouple temperatures successively at regular intervals in the above mentioned Patent 2,150,502.

As is well known, the accuracy of measurements obtainable with potentiometric apparatus of the general type diagrammatically illustrated in Fig. 1, requires that the current flow produced by the circuit energizing battery be kept approximately constant. The voltage of such a battery as is customarily used to energize a potentiometric circuit, diminishes as the battery ages. Significant measuring inaccuracy due to the progressive decrease in the voltage of the energizing battery may be, and customarily is avoided by frequent recalibration adjustments in each of which the amount of the resistance 2 in series with the energizing battery is reduced.

For the recalibration purpose of the present invention, resistors 8 and 10 are made equal to one another in resistance value so that the potentiometric network of Fig. 1 may be as readily calibrated when the switches E and e are in engagement with the contacts $E^2$ and $e^2$, respectively, as when they are in engagement with the contacts E' and e'. In either case calibration is effected by adjusting the switch C into the position in which it engages the contact $C^2$, and then adjusting the resistance 2 as required to make the potential drop in the resistor 9 and in one of the two equal resistors 8 and 10, equal to the opposing voltage of the standard cell Sc. Whether the voltage of the standard cell Sc is balanced against the potential drop in the resistors 8 and 9 or against the similar potential drop in the resistors 9 and 10 depends, of course, on whether the switches E and e are in position to respectively engage the contacts E' and e' or to engage the contacts $E^2$ and $e^2$, and the calibration result obtained will be the same when the switches E and e are in engagement with the one set of contacts as when they are in engagement with the other set of contacts.

The fact that the measuring branch of the network shown in Fig. 1, when closed, includes the range switch E as well as the standardizing switch C, the fact that the calibrating branch, when closed, includes the switch e as well as the switches E and C, and the further fact that those switches have unknown and variable resistances, do not affect the accuracy of the measuring and calibration results obtainable with the apparatus. A variation in the resistance of any of those switches has no significant effect on the resistance of, or current flow through any portion of the split potentiometer or bridge. The effect of variations in the resistances of switches E and C on the overall resistance of the measuring circuit branch has no significant effect on the accuracy of the measurement obtainable, since that measurement is obtained by so balancing the network that there is no current flow through the measuring branch. Similarly, calibration is effected by the null method, and variations in the switch resistance in the calibration circuit do not prevent proper calibration, since there is no current flow through the calibration branch when calibration is effected.

Fig. 2 diagrammatically illustrates a form of the present invention used to make the effective length of the scale employed to measure a given range of voltage variation substantially greater than the length of the deflection range of the potentiometric instrument used in measuring the voltage. In Fig. 2, EA and ea represent switch members associated with a potentiometric network which may be exactly like the network shown in Fig. 1, and may be associated with the said network exactly as the switch members E and e are associated with the network shown in Fig. 1. In Fig. 2 the link $E^{10}$ which replaces the link Ee of Fig. 1 is pivotally connected to pivoted arms $E^{11}$ and $E^{12}$, one or the other of which is engaged and angularly adjusted by a deflecting exhibiting element GA when the latter moves from one end to the other end of its deflection range. The exhibiting element GA of Fig. 2 may be adjusted in response to variations in the voltage measured exactly as are the contact A and the marking element g of Fig. 1, and as is the pen ga of Fig. 3 to which further reference is hereinafter made. When the exhibiting element GA of Fig. 2 deflects into its low scale position, it engages the arm $E^{11}$ and adjusts the switches EA and ea into engagement with the contacts E' and e', respectively, if those switches were previously in engagement with the contacts $E^2$ and $e^2$, respectively. Similarly, when the element GA moves into its high scale position, it engages the arm $E^{12}$ and moves the switches EA and ea into the positions in which they respectively engage the switch contacts $E^2$ and $e^2$, if those switches were previously in engagement with the contacts E' and e'.

For the purpose of the arrangement shown in Fig. 2, the potentiometer circuit resistors are so proportioned and related that the potential drop in the resistor 8 is slightly less than the potential drop in the slide wire resistance 4. In consequence the adjustment of switch member EA from engagement with contact E' into engagement with contact $E^2$ normally causes the exhibiting element GA to deflect from its right hand end or high scale position into a position adjacent but somewhat to the right of the left hand end or low scale position. When thereafter a down scale deflection of the member GA returns the switch member EA into engagement with contact E', the element GA will be caused to deflect up scale into a position adjacent but somewhat to the left of its right hand end or high scale position.

When the switches EA and ea engage the contacts E' and e' respectively, the element GA cooperates with the scale H of Fig. 2 to show the value of the thermocouple or other voltage measured when that value is in a low end portion of its range of variation, and when the switches EA and ea engage the contacts $E^2$ and $e^2$, respectively, the element GA cooperates with the scale h to show the value of the thermocouple or other voltage measured in the upper portion of the range of variation of said value. If, for example, it is assumed that the apparatus shown in Fig. 2 is intended to measure thermocouple variations corresponding to a thermocouple temperature range from zero to 1800 degrees, the scale H may be graduated in degrees from 0° to 1000° and the scale h may be graduated in degrees from 900° to 1800°, such degree graduations being shown by way of example in Fig. 2. Each of the scales H and h thus forms an overlapping extension of the other since in a small intermediate portion of its range, the value of the quantity measured may be shown either on the scale H or on the scale h depending upon the adjustments of the switches EA and ea. With the scale marking shown in Fig. 2, this overlapping intermediate temperature range extends from 900° to 1000°. The overlapping of the two scales whereby the zero end of the scale H is alongside the 900° point of the scale h and not alongside the 1000° point of the latter, avoids a multiplicity of adjustments of the switches EA and ea which would otherwise be required when the temperature measured fluctuates in the small temperature range which, with the arrangement shown in Fig. 2, may be measured on either of the scales H and h.

Ordinarily, apparatus of the character shown in Fig. 2 may advantageously include means showing whether the adjustment condition of the apparatus is such that the measurements being made are shown on the scale H or on the scale h. Thus, for example, as shown in Fig. 2, the link $E^{10}$ may be connected through a pivoted arm I' to a flag I adjusted into one position when the adjustment of the apparatus is that the measurements made should be read on the scale H, and into a second position when the adjustment of the apparatus is such that the measurements made should be read on the scale h.

The inventive features illustrated diagrammatically in Figs. 1 and 2 are adapted for use in, and in association with, potentiometric instruments of various forms, and in particular are well adapted for use in and association with the widely used type of potentiometric instrument known as a "Brown potentiometer" illustrated in part in Fig. 3, and disclosed in various patents including, in particular, Patent 2,150,502 of March 14, 1939, and Patent 2,252,301 of August 12, 1941. The instrument shown somewhat diagrammatically in Fig. 3 comprises a galvanometer DA, a slidewire resistance 4A and a cooperating contact AA corresponding in function and operative effect to the galvanometer D, slide resistance 4, and contact A of Fig. 1.

In the instrument shown in Fig. 3, the galvanometer pointer D', when deflected away from its neutral position as a result of potentiometer unbalance, cooperates with a pointer position gauging element J and an oscillating control shaft J', to control a mechanical relay mechanism. The latter includes oscillating pawls K and a constantly rotating power shaft L and operates to angularly adjust a toothed wheel M in a direction and to an extent depending on the deflection of the galvanometer pointer D' from its neutral position. The wheel M is secured to, and by its angular adjustment angularly adjusts a shaft M', which is gear connected to a rotatable support N which carries the slidewire contact AA. An angular adjustment of the member N causes a corresponding movement of the contact AA and slidewire resistance 4A longitudinally of the latter analogous to the adjustment of the contact A longitudinally of the resistance 4 of Fig. 1. The angular adjustment of the toothed wheel M angularly adjusts a gear O' and a shaft O on which the gear O' is secured. The shaft O is formed with a helical thread groove $O^2$, engaging a nut portion (not shown) of a carriage $G^{10}$, in which the previously mentioned recording pen ga is supported. The rotation of the shaft O thus adjusts the carriage $G^{10}$ longitudinally of the shaft O and longitudinally of the constantly rotating parallel shaft G'' which gives the traveling record shaft strip G its longitudinal movement.

To adapt the instrument shown in Fig. 3 for use in the practice of the invention diagrammatically illustrated in Fig. 2 it is provided with mechanism for adjusting mercury switches EB and eb in response of the movement of the carriage $G^{10}$ into its end positions as the switches EA and ea of Fig. 2 are adjusted by the movements of the exhibiting element GA into its end positions. The means shown in Fig. 3 for thus adjusting the mercury switches EB and eb comprises a wheel P which is gear connected to the shaft O, and carries a pin P'. The latter engages and angularly adjusts a switch supporting member Q in one direction or the other when the angular adjustment of the wheel moves the member Q at one side or the other of its supporting shaft Q'. In the arrangement shown, the member Q is yieldingly held in either of the two positions in which it may be adjusted by the pin P', until the latter again engages the member Q and adjusts it in its opposite direction. The mercury switches EB and eb are mounted on the member Q and the operative effect of the angular adjustment in opposite directions of the member Q on the potentiometer circuit with which these switches are associated may be exactly the same as the effect on the network shown in Fig. 2 of the adjustment of the switches EA and ea between the positions in which they engage the contacts E' and e', and the positions in which they engage the contacts $E^2$ and $e^2$. Alternative arrangements by which an instrument of the general type shown in Fig. 3 may effect switch adjustments, analogous to those just described, on the movement of its pen carriage into predetermined positions are disclosed in the above mentioned Patent 2,252,301.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A potentiometric measuring circuit for measuring the magnitudes of a plurality of varying voltage sources of approximately the same range of variation comprising an energizing branch including a source of current, a second branch including a slidewire resistance and a third branch including a resistor, each of said second and third branches being connected in parallel with the other and in series with the said energizing branch, a contact adjustable along said slidewire resistance, a current responsive device, and means including a switch for successively connecting said voltage sources one at a time with said device in series therewith between said contact and said third branch at one end or the other of said resistor depending upon the adjustment of said switch.

2. Apparatus for measuring and recording on a common record chart the voltages of a plurality of varying voltage sources of approximately the same range of variation, comprising in combination a potentiometric circuit network including a slidewire resistance and a contact adjustable along said resistance in accordance with the variations in the values of the voltage measured, means for successively connecting said voltage sources one at a time into said network, means for effecting adjustments in said network as the different voltage sources are connected into the latter so as to establish a predetermined relation between the voltage of each source and the position to which said contact is adjusted in measuring said voltage which is different from the corresponding relation established in measuring the voltage of another of said voltage sources and recording means adjusted in accordance with the adjustment of said contact along said resistance.

3. A potentiometric measuring circuit for measuring the magnitudes of two varying voltage sources of approximately the same magnitude comprising an energizing branch including a source of current, a second branch including a slidewire resistance, and a third branch including first and second resistors in series and of equal resistance, each of said second and third branches being connected in parallel with the other and in series with said energizing branch, a switch adjustable into engagement with the said first resistor at one end or the other of the latter depending upon the adjustment of said switch, a second switch adjustable into engagement with the second resistor at one end or the other of the latter depending on the adjustment of the last mentioned switch, a contact adjustable along said slidewire resistance, a current responsive device, means including the first mentioned switch for connecting one of said sources of voltage to be measured and said device in series between said contact and said third branch at one end or the other of said first resistor and for connecting the other of said sources of voltage to be measured and said device in series between said contact and said third branch at the other end of said first resistor, and calibrating means including a standard cell for connecting said cell and device in series with both of said switches and one or the other of said resistors, depending on the adjustment of said switches.

4. A potentiometric measuring circuit for measuring the magnitudes of two varying voltage sources of approximately the same magnitude comprising an energizing branch including a source of current, a second branch including a slidewire resistance and a third branch including first and second resistors in series and of equal resistance, each of said second and third branches being connected in parallel with the other and in series with said energizing branch, a switch adjustable into engagement with said first resistor at one end or the other of the latter, a second switch connected to the first mentioned switch for adjustment into engagement with the second resistor at one end or the other of the latter depending on the adjustment of the first mentioned switch, a contact adjustable along said slidewire resistance, a current responsive device, means including the first mentioned switch for connecting one of said sources of voltage to be measured and said device in series between said contact and said third branch at one end or the other of said first resistor and for connecting the other of said sources of voltage to be measured and said device in series between said contact and said third branch at the other end of said first resistor, and calibrating means including a standard cell and both of said switches for connecting said cell and device in series with a portion of said third brach including one or the other of said resistors, depending on the adjustment of said switches.

5. The combination with a self balancing potentiometric instrument of an associated potentiometric circuit network including a split potentiometer comprising a branch including a scale suppression resistor, a measuring circuit branch, a calibrating branch, a switch adjustable to vary the relation of said measuring circuit branch to said resistor and thereby vary the scale range of said instrument, a second switch adjustable to vary the relation of said calibration circuit branch to said resistor to permit calibration of said network with either adjustment of the first mentioned switch, and means actuated by said instrument to simultaneously adjust the two switches in automatic response to a predetermined variation in the operative condition of said measuring circuit branch.

6. A potentiometric measuring circuit comprising an energizing branch including a source of current, a second branch including a slidewire resistance, a third branch including a resistor section, said second and third branches being each connected in parallel with the other and in series with the said energizing branch and said slidewire resistance and resistor being so proportioned and disposed that the potential drop in said resistance is somewhat in excess of that in said resistor, a contact adjustable along said slidewire resistance, a current responsive device, means including a switch for connecting a source of voltage to be measured and said device in series between said contact and said third branch at one end or the other of said resistance section depending upon the adjustment of said switch, and self balancing instrument mechanism comprising means controlled by said device for adjusting said contact along said resistance in accordance with variations in the voltage measured, and means for adjusting said switch in accordance with predetermined changes in the voltage measured.

EDGAR M. SMITH.